UNITED STATES PATENT OFFICE.

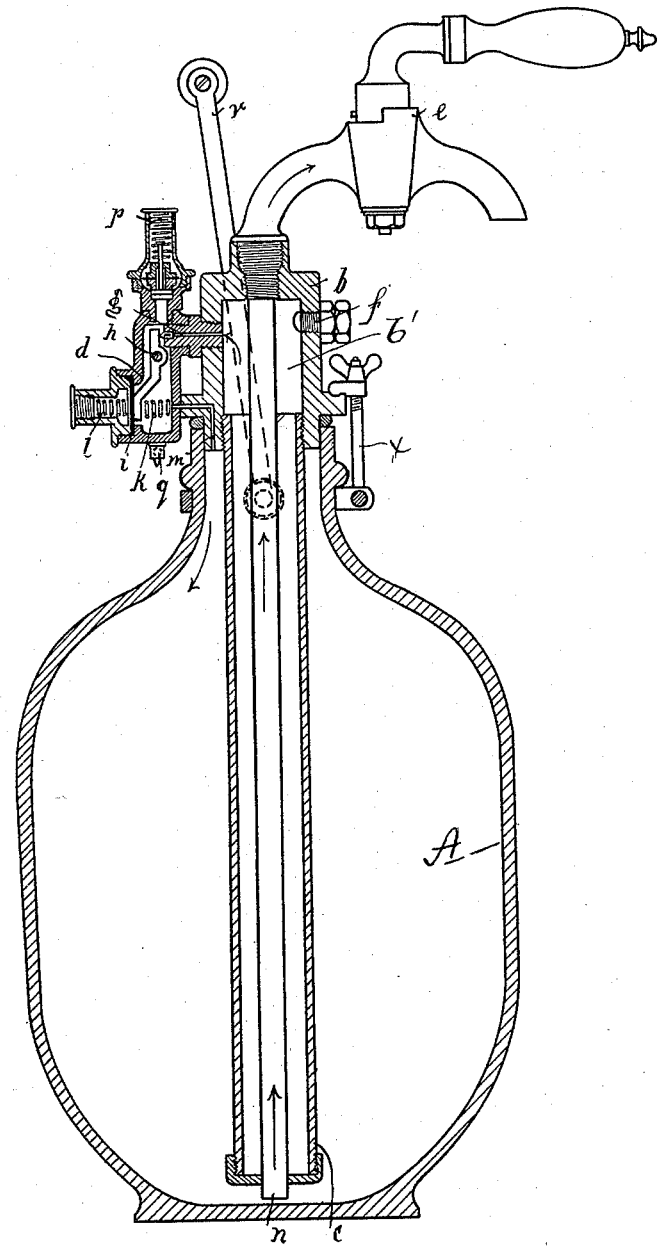

WILHELM KRÜGER, OF BERLIN, GERMANY.

BEER-SIPHON.

SPECIFICATION forming part of Letters Patent No. 586,190, dated July 13, 1897.

Application filed November 14, 1896. Serial No. 612,090. (No model.)

*To all whom it may concern:*

Be it known that I, WILHELM KRÜGER, a subject of the German Emperor, residing at Berlin, Germany, have made certain new and useful Improvements in Beer-Siphons, of which the following is a specification.

The object of this invention is to produce a beer-siphon which is intended to supply for household and private use beer which is always kept under an equal degree of pressure, while the carbonic acid is made useful equably and thoroughly. The beer rises through a tube which passes through the carbonic-acid reservoir to the faucet, while the reduction-valve regulates the admission of carbonic-acid gas to the beer-reservoir by means of a lever which is handled by adjustable spring-pressure.

On the accompanying drawing the new siphon is shown in vertical section.

The carbonic-acid reservoir $c$, attached to the plug $b$, depends into the beer-receptacle A. The plug, which carries also the reduction-valve $d$ and the faucet $e$, is tightened on the beer-receptacle by a thumb-screw and threaded bolt $x$. The carbonic acid is filled in through the aperture F, which is closed by a screw, and through the bore $g$ of a threaded nipple it enters into the reduction-valve $d$. The pressure of the carbonic acid forces back the arm of the lever $h$, which lies before the aperture $g$. The other arm of the lever lies against a membrane $i$ and is influenced by the springs $k$ and $l$.

If the pressure of the carbonic acid in the reduction-valve rises too high, the membrane $i$ is lifted and the lever $h$ closes the exit through the pressure of spring $k$.

When the surplus pressure is reduced, the regulating set-spring $l$ raises the lever off, so that carbonic-acid gas can again fill the valve. From there the gas flows into the beer-tank through the canal $m$ and presses the liquid out through the tube $n$, which rises within the carbonic-acid reservoir, reaching to the faucet.

As the raising-pipe $n$ passes through the carbonic-acid reservoir, cooling off the beer is brought about without necessitating the use of ice, &c.

To preclude the possibility of explosion, a safety-valve $p$ can be attached to the reduction-valve $d$. This safety-valve is attached in a manner to let the carbonic acid escape whenever a certain surplus pressure exists. In filling the siphon air escapes through the air-valve $q$. The handle $r$ is intended to facilitate transportation of the apparatus.

The acid-reservoir is arranged centrally of the beer vessel and is carried by the plug or stopper $b$, which has a chamber $b'$, from which the port $g$ leads laterally to the regulating-chamber. The passage $m$ extends from the regulating-chamber through the shell of the plug down alongside of the acid-receptacle. The discharge-pipe for the beer extends centrally through the acid-holder. This provides a compact and effective arrangement.

I claim—

1. In combination with beer-receptacle, the hollow stopper fitting therein, the acid-reservoir depending from the lower end of the stopper into the beer vessel, the discharge-pipe for the beer extending through the acid-reservoir whereby the same acts both as an acid-holder and as a cooling-receptacle for the beer, the reduction-valve case arranged laterally of the hollow stopper and having a passage connecting therewith, the valve controlling the passage, the diaphragm in the valve-casing, the lever connecting the diaphragm with the valve and the passage from the valve-casing extending down alongside of the reservoir through the stopper, substantially as described.

2. In combination with the beer vessel, the carbonic-acid reservoir, the reduction-valve with ports connecting the reservoir with the interior of the vessel, and the discharge-pipe for the beer extending through the reservoir whereby said reservoir serves both as a container for the acid and as a cooling-chamber for the beer-pipe, substantially as described.

In witness whereof I have hereunto set my hand in presence of two witnesses.

WILHELM KRÜGER.

Witnesses:
W. HAUPT,
HENRY HARPER.